US008566933B2

(12) United States Patent
Ohta et al.

(10) Patent No.: US 8,566,933 B2
(45) Date of Patent: Oct. 22, 2013

(54) STATE NOTIFICATION APPARATUS, STATE NOTIFICATION METHOD, AND COMPUTER-READABLE STORAGE MEDIUM

(75) Inventors: Ken Ohta, Tokyo (JP); Hiroshi Inamura, Tokyo (JP); Chie Noda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 102 days.

(21) Appl. No.: 12/956,052

(22) Filed: Nov. 30, 2010

(65) Prior Publication Data
US 2011/0138464 A1 Jun. 9, 2011

(30) Foreign Application Priority Data

Dec. 4, 2009 (JP) ................................. 2009-276638
Aug. 16, 2010 (JP) ................................. 2010-181699

(51) Int. Cl.
*H04L 29/06* (2006.01)
*G06F 21/00* (2006.01)
(52) U.S. Cl.
USPC ........................................... 726/22; 713/189
(58) Field of Classification Search
USPC ................................ 726/22, 25; 713/189–194
See application file for complete search history.

(56) References Cited

U.S. PATENT DOCUMENTS 6,292,900 B1 * 9/2001 Ngo et al. ......................... 726/6

FOREIGN PATENT DOCUMENTS

| EP | 1329787 A2 | 7/2003 |
| EP | 1778507 A1 | 5/2007 |
| EP | 1788507 A2 | 5/2007 |
| JP | 06-334778 | 12/1994 |
| JP | 2005129050 A | 5/2005 |
| WO | 2009/099706 A1 | 8/2009 |
| WO | 2009099706 A1 | 8/2009 |

OTHER PUBLICATIONS

EP Search Report Dated Mar. 3, 2011 for EP 10193633.4-1245.
EP Examination Report Dated Mar. 22, 2011 for EP 10193633.4-1245.
Office Action dated Mar. 22, 2012, issued in conjunction with European Patent Application No. 10193633.4.
Chinese Application No. 201010570226.7, First Office Action issued Dec. 24, 2012, pp. 1-11.

* cited by examiner

*Primary Examiner* — Lisa Lewis
(74) *Attorney, Agent, or Firm* — Michaud-Kinney Group LLP

(57) ABSTRACT

A state notification apparatus comprises: a holding unit that, when one or more secure runtime environments and one or more non-secure runtime environments are selectively executed in a foreground, holds an identifier of a runtime environment that is being executed in the foreground; a determination unit that determines a state of the runtime environment executed in the foreground based on the identifier held by the holding unit; and a notification unit that causes a hardware device that cannot be accessed from the one or more non-secure runtime environments to notify the state determined by the determination unit.

19 Claims, 5 Drawing Sheets

| IDENTIFIER | STATE |
|---|---|
| 1 | SECURE |
| 2 | NON-SECURE |

| FUNCTION | STATE |
|---|---|
| TELEPHONE CALL FUNCTION | NON-SECURE |
| SMS FUNCTION | NON-SECURE |
| GPS FUNCTION | SECURE |

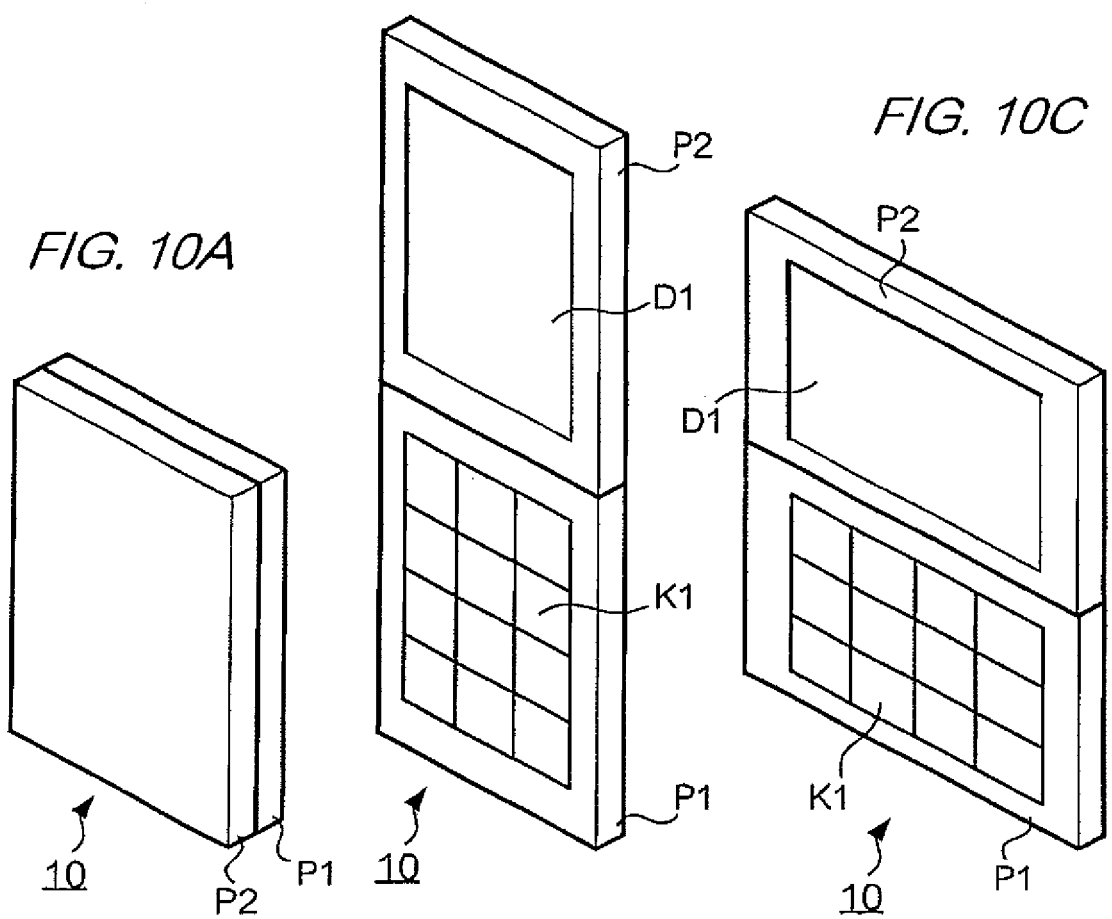

STATE NOTIFICATION APPARATUS, STATE NOTIFICATION METHOD, AND COMPUTER-READABLE STORAGE MEDIUM

CROSS-REFERENCE TO RELATED APPLICATIONS

This application is based on and claims priority under 35 U.S.C. 119 from Japanese Patent Application No. 2009-276638, which was filed on Dec. 4, 2009, and Japanese Patent Application No. 2010-181699, which was filed on Aug. 16, 2010.

TECHNICAL FIELD

The present invention relates to a technology that indicates which of multiple runtime environments in a single apparatus is operated by a user, when runtime environments having different usages, security levels, systems of operation, or the like are available in the apparatus.

BACKGROUND

A single apparatus can have multiple runtime environments having different usages, security levels, systems of operation, or the like. For example, a secure runtime environment and a non-secure runtime environment can be executed in such an apparatus, and in such a situation, it may be desirable to notify a user of a security level of the runtime environment being operated. It is to be noted here that the non-secure runtime environment is, for example, a runtime environment that allows installation and execution of software provided by a third party. JP2005-129050A discloses a technology in which a GUI (Graphical User Interface) element associated with a secured runtime environment is hidden from another runtime environment, and the GUI element is displayed to a user in the secured runtime environment.

SUMMARY

However, even when information of a secure (or secured) runtime environment is hidden from a non-secure runtime environment, there is a possibility that malicious software may infer the information, and cause the information to be displayed to mimic the secure runtime environment. In such a case, a user may be unable to identify the displayed information, or making such identification puts a burden on a user.

In view of the above background, an object of the present invention is to allow a user to know which runtime environment is running in the foreground in a simple and reliable manner.

A state notification apparatus according to one aspect of the present invention comprises: a holding unit that, when one or more secure runtime environments and one or more non-secure runtime environments are selectively executed in a foreground, holds an identifier of a runtime environment that is being executed in the foreground; a determination unit that determines a state of the runtime environment executed in the foreground based on the identifier held by the holding unit; and a notification unit that causes a hardware device that cannot be accessed from the one or more non-secure runtime environments to notify the state determined by the determination unit.

In a preferred embodiment of the present invention, the state notification apparatus further comprises an attribute-setting unit that sets an attribute of each of the runtime environments, wherein the determination units determines the state based on the identifier held by the holding unit and the attributes set by the attribute-setting unit.

In another preferred embodiment of the present invention, the attributes represent security levels of the respective runtime environments.

In yet another preferred embodiment of the present invention, when a function that operates across the secure runtime environment and the non-secure runtime environment is executed, the determination unit determines a constant state corresponding to the function.

In such an embodiment, it will be more preferable if, in a case where a function that operates across the secure runtime environment and the non-secure runtime environment is executed, the notification unit causes the notification of the state to be performed in a manner different to that in which the notification is performed in another case.

In yet another preferred embodiment of the present invention, the state notification apparatus further comprises a runtime environment-switching unit that switches the runtime environment executed in the foreground according to an output from an operation unit, wherein the hardware device includes a hardware device that also functions as the operation unit.

In such an embodiment, it will be more preferable if the operation unit includes a first part and a second part that can be viewed by a user, positions of the first part and the second part relative to each other being changeable by folding, sliding, or rotating action, to achieve switching of the runtime environment or notification of the state.

Alternatively, it will be more preferable if the hardware device includes a touch screen device having a specific area that cannot be accessed from the non-secure runtime environment and another area that can be accessed from the non-secure runtime environment, the specific area realizing the operation unit.

In yet another preferred embodiment of the present invention, the hardware device includes a display device, an illumination device, an audio device, a vibrator device, or a switch device.

In yet another preferred embodiment of the present invention, the holding unit acquires an identifier of the runtime environment executed in the foreground, the identifier being managed by a display function that switches display of a screen corresponding to the runtime environment executed in the foreground, and the holding unit switching the identifier held by the holding unit in response to switching of the screen.

In yet another preferred embodiment of the present invention, the notification unit notifies the state in response to a user operation.

In yet another preferred embodiment of the present invention, the notification unit notifies the state at least one of when the apparatus returns from a power-saving state to a normal state, when locking of an operation unit is released, when the apparatus is started up, and at every predetermined period.

In yet another preferred embodiment of the present invention, the state notification apparatus further comprises a process-suspending unit that, when a runtime environment executes a specific process, suspends the specific process, wherein when the process-suspending unit suspends the specific process, the notification unit causes the hardware device to notify a state corresponding to the process.

In yet another preferred embodiment of the present invention, the notification unit notifies the state in a manner according to a direction of switching of the runtime environment.

In yet another preferred embodiment of the present invention, the notification unit causes a mode of notification to change depending on whether the switching of the runtime environment executed in the foreground is caused by a user operation or a system event.

In yet another preferred embodiment of the present invention, the notification unit can cause a plurality of said hardware devices to notify the state, and when there is a hardware device used by any of the runtime environments for a function other than the notification, uses another hardware device to notify the state.

In yet another preferred embodiment of the present invention, the state notification apparatus further comprises a pattern-setting unit that sets a pattern of notification of the state by the notification unit.

In yet another preferred embodiment of the present invention, the notification unit notifies the state of a runtime environment corresponding to a displayed window in a single window system, or notifies the state of a runtime environment corresponding to a window that is displayed forefront in a multi-window system.

In another aspect of the present invention, there is provided a state notification method executed by a state notification apparatus, comprising: when one or more secure runtime environments and one or more non-secure runtime environments are selectively executed in a foreground, holding an identifier of a runtime environment that is being executed in the foreground; determining a state of the runtime environment executed in the foreground based on the held identifier; and causing a hardware device that cannot be accessed from the one or more non-secure runtime environments to notify the determined state.

In yet another aspect of the present invention, there is provided a non-transitory computer-readable storage medium storing a program for causing a computer to execute the steps of: when one or more secure runtime environments and one or more non-secure runtime environments are selectively executed in a foreground, holding an identifier of a runtime environment that is being executed in the foreground; determining a state of the runtime environment executed in the foreground based on the held identifier; and causing a hardware device that cannot be accessed from the one or more non-secure runtime environments to notify the determined state.

The present invention can allow a user to know which runtime environment is running in the foreground in a simple and reliable manner.

BRIEF DESCRIPTION OF THE DRAWINGS

Exemplary embodiments of the present invention will now be described in detail with reference to the following figures, wherein:

FIGS. 10A-10C are diagrams showing an exemplary mode of notification.

DETAILED DESCRIPTION

Figure 1:
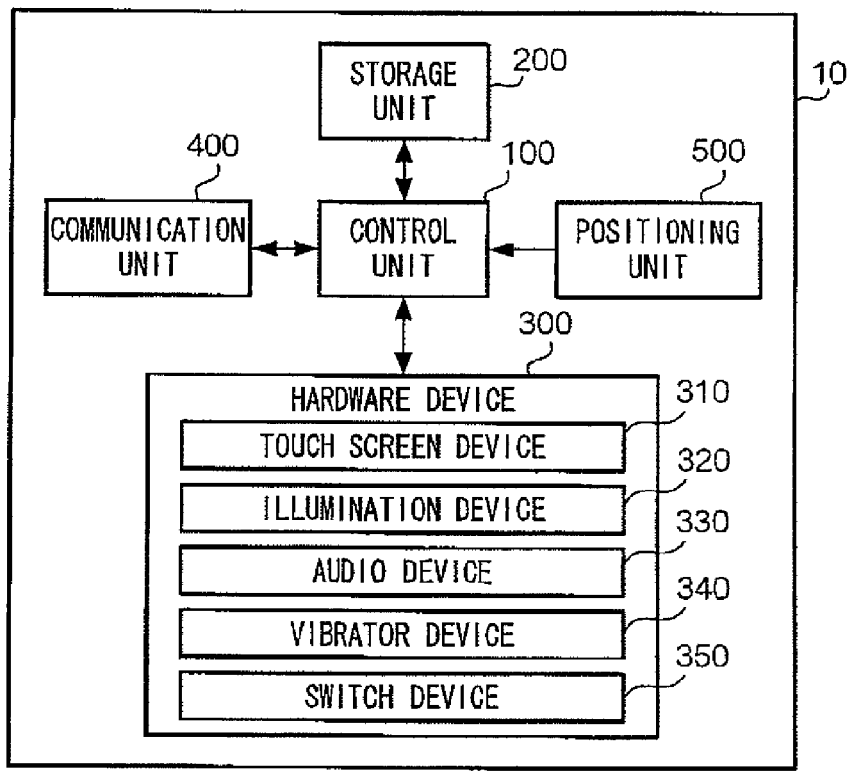
FIG. 1 is a block diagram showing a hardware configuration of an information-processing apparatus.

FIG. 1 is a block diagram showing a hardware configuration of an information-processing apparatus according to an exemplary embodiment of the present invention. Information-processing apparatus shown in FIG. 1 can use multiple runtime environments to run application software (hereinafter, "application"). In this description of the present embodiment, it is assumed that information-processing apparatus 10 is basically a mobile communication terminal (a mobile phone, a smart phone, or the like). However, it is to be noted that information-processing apparatus 10 may be another information-processing apparatus such as a personal computer or the like, and does not have to have a communication function.

Runtime environments executed by information-processing apparatus 10 include a secure runtime environment and a non-secure runtime environment. A "runtime environment" herein is a set of programs necessary for executing applications, and may be an OS (Operating System), for example. Also, when a runtime environment is "secure," it means that security of the runtime environment is assured. For example, a closed runtime environment, that is, a runtime environment that allows execution of only trusted software is considered to be secure. On the other hand, when a runtime environment is "non-secure," it means that the runtime environment is not secure. For example, a runtime environment that allows software provided by a third party to be freely installed and executed is considered to be non-secure. Whether a runtime environment is secure may be determined in advance or may be determined based on evaluation of a security level of the runtime environment by information-processing apparatus 10.

Information-processing apparatus 10 includes control unit 100, storage unit 200, and hardware device(s) 300. Control unit 100 includes a processor such as a CPU (Central Processing Unit) and a storage means serving as a memory (main memory), and executes a program to control various parts of information-processing apparatus 10. Storage unit 200 includes a storage means serving as an auxiliary storage device such as a hard disk, flash memory, or the like, and stores data used by control unit 100. It is to be noted that storage unit 200 may include a storage means that readily can be attached to/detached from information-processing apparatus 10, such as a memory card, and a drive unit therefor.

Hardware device(s) 300 operates according to instructions received from control unit 100 to provide information to a user. In the present embodiment, hardware device(s) 300 includes at least touch screen device 310, and may additionally include one or more of illumination device 320, audio device 330, vibrator device 340, and switch device 350, as necessary.

Touch screen device 310 is constituted of a display device for displaying an image, which display device is provided with a function of an operation means. The display device is constituted of a liquid crystal display or an organic EL (Electroluminescence) display, for example, together with a drive circuit for driving the display. The operation means of touch screen device 310 may be of any type, so long as it can receive an instruction input by a user (typically, an instruction input by touching of the screen) to the display device. It is to be noted that touch screen device 310 can be substituted by a display device and an operation means (such as a keypad) that are separated from each other, or by a device including a touch screen and another operation means.

Illumination device 320 notifies a user of a state of information-processing apparatus 10 by use of a light source such as an LED (Light-Emitting Diode) or the like. Illumination device 320 may notify multiple states by use of different light colors, for example. However, with a monochrome light source, it is possible to notify two states by turning on and off the light source. Further, illumination device 320 can notify multiple states by flashing lights on and off in different patterns, so that they can be distinguished from one another.

Audio device 330 includes a speaker, an earphone, or the like to output a sound. The sound here may be a beeping sound, a music melody or a sound resembling a human voice.

Vibrator device 340 causes a part or a whole of information-processing apparatus 10 to vibrate. For example, vibrator device 340 generates vibration by rotating a weight by use of a motor.

Switch device 350 includes a member (e.g., a button or a lever) that can change its position relative to a part (e.g., a housing) of information-processing apparatus 10, the changed position serving a function of performing a state notification. For example, switch device 350 may be configured to include a button that can be in two states: a state in which the button protrudes relative to the housing and a state in which the button is depressed. Switch device 350 may be adapted such that not only does it operate according to an instruction from control unit 100, but also its state changes in response to an operation performed by a user.

It is to be noted that hardware device(s) 300 may include a plurality of devices that cooperate to notify information. For example, vibrator device 340 may change a mode of vibration depending on information (such as an image, light, sound, or the like) notified by another device.

Further, though each hardware device 300 may be an element (component part) included in information-processing apparatus 10, it may be a device separate from information-processing apparatus 10. For example, it is possible that information-processing apparatus 10 has an output terminal for outputting a video signal in place of touch screen device 310, and a display device having an input terminal for receiving a video signal and an operation means is connected thereto.

Also, information-processing apparatus 10 preferably includes communication unit 400 and positioning unit 500. Communication unit 400 connects to a communication network (e.g., mobile communication network) to conduct data communication. The data communication here includes voice phone calls. Positioning unit 500 includes a receiver for acquiring position information of information-processing apparatus 10. Positioning unit 500 performs positioning by use of a GPS (Global Positioning System), for example.

Communication unit 400 and positioning unit 500 are similar to hardware device 300 in a sense that they operate according to instructions received from control unit 100. However, Communication unit 400 and positioning unit 500 differ from hardware device 300 in that they are adapted to notify a state of information-processing apparatus 10. Namely, "hardware device 300" in the present embodiment is a hardware device that has a function of notifying a state of information-processing apparatus 10.

Figure 2:
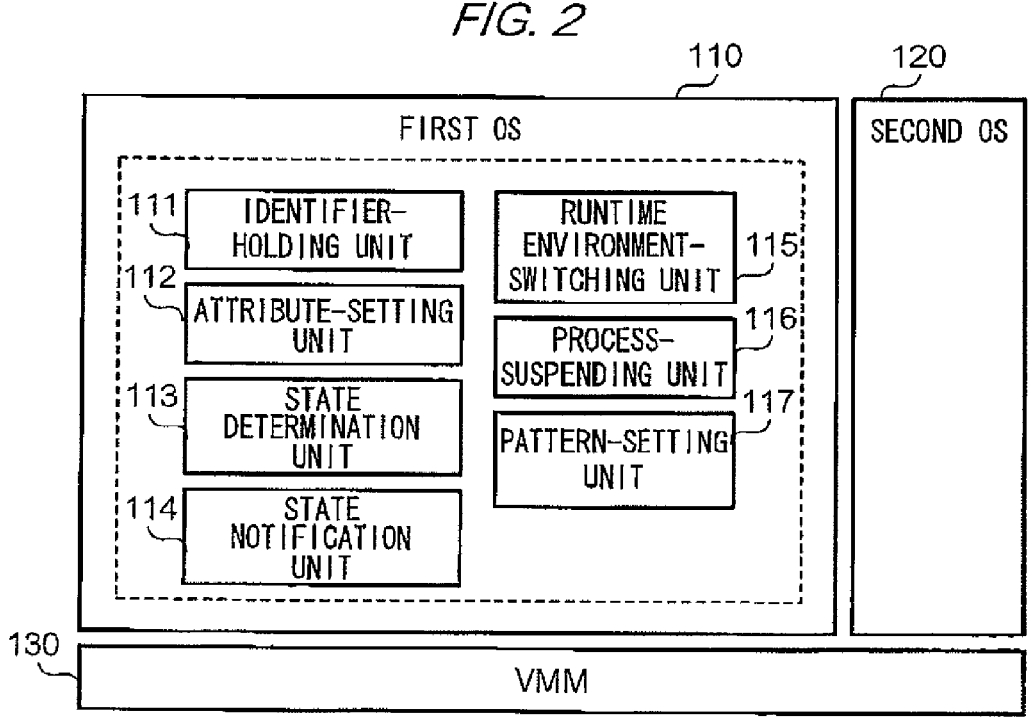
FIG. 2 is a functional block diagram showing functions implemented by a control unit.

FIG. 2 is a functional block diagram showing functions implemented by control unit 100. Control unit 100 uses VMM (Virtual Machine Monitor) 130 to implement first OS 110 and second OS 120. It is to be noted here that first OS 110 corresponds to an example of a "secure runtime environment" and second OS 120 corresponds to an example of a "non-secure runtime environment." First OS 110 and second OS 120 respectively execute predetermined applications.

VMM 130 functions as an execution means that executes first OS 110 and second OS 120, and executes one of these OS's in the foreground. It is to be noted here that when an OS is executed in the "foreground," it means that the OS receives an input through an operation of touch screen device 310 (or a keypad) by a user. In a single window system, the OS executed in the foreground is an OS whose window is displayed, and in a multi-window system, the OS executed in the foreground is an OS whose window is active and displayed at the forefront. Thus, VMM 130 can implement either of the single window system or the multi-window system. Also, VMM 130 switches the runtime environment executed in the foreground in response to a user operation or a system event (which may be unrelated to a user operation).

In the present embodiment, a function of a state notification apparatus of the present invention is realized by first OS 110. Specifically, first OS 110 executes a process corresponding to a function of each of identifier-holding unit 111, attribute-setting unit 112, state determination unit 113, and state notification unit 114, thereby to realize the function of the state notification apparatus of the present invention. Preferably, first OS 110 executes a process corresponding to a function of each of runtime environment-switching unit 115, process-suspending unit 116, and pattern-setting unit 117 as an optional function of the state notification apparatus of the present invention. It is to be noted, however, that the function corresponding to the state notification apparatus of the present invention may be realized by means other than an OS.

Identifier-holding unit 111 holds an identifier of the runtime environment executed in the foreground. In the present embodiment, identifier-holding unit 111 holds, as the identifier, an item of data that indicates which of first OS 110 and second OS 112 is being executed in the foreground. For example, the identifier may be a predetermined number (ID) such as "1" for first OS 110 or "2" for second OS 112, or may be a name or a version number of each OS. Further, when the runtime environment in the foreground is switched and display of a screen of the display device is switched by a display function, identifier-holding unit 111 operates in response to such switching, to acquire and hold a new identifier. It is to be noted here that the display function is a function that controls display of a screen, and is implemented by an OS or dedicated software. The display function holds an identifier of the runtime environment executed in the foreground and switches display of a screen by use of the identifier. Also, when software that manages a mode of display (appearance, position, or the like) of a window, such as a window manager, is running, identifier-holding unit 111 can acquire the identifier from the window manager.

Attribute-setting unit 112 sets an attribute of each runtime environment, and holds the set attribute. Though the attribute may be simply an identifier itself, it preferably serves to associate the identifier with another index. For example, the attribute represents a security level of each runtime environment. In a case where each runtime environment conducts communication via communication unit 400 with a different fee system for the communication, the attribute may represent a type of a fee system (a fixed fee system, a use-dependent fee system, or the like). Further, in a case where an available operation means is different for each runtime environment, the attribute may represent an available system of operation, i.e., a type(s) of the available operation means (such as a touch screen only, a keypad only, both a touch screen and a keypad, or the like). Also, identifier-setting unit 112 may associate any combination of these attributes with an identifier.

Figures 3, 4, 5:
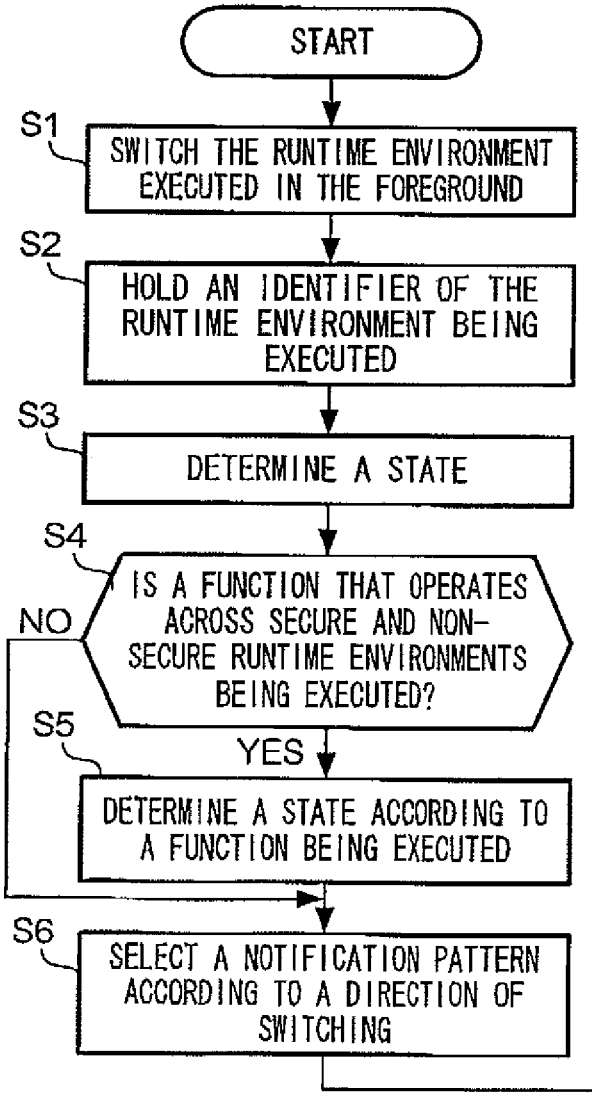
FIG. 3 is a table setting forth a correspondence between identifiers of runtime environments and their attributes.
FIG. 4 is a table setting forth a correspondence between functions executed across multiple runtime environments and states determined for respective functions.
FIG. 5 is a flowchart showing a notification process.

FIG. 3 shows an example of a table setting forth a correspondence between identifiers of runtime environments and their attributes. In this table, identifier "1" represents first OS 110, and identifier "2" represents second OS 120. In this example, first OS 110 is a secure runtime environment, and second OS 120 is a non-secure runtime environment. Such correspondence between identifiers and attributes may be hard-coded in software or may be provided as a table separate from software.

It is to be noted that the function corresponding to attribute-setting unit 112 is dispensable. For example, in a case where an attribute is an identifier itself, holding of an identifier by identifier-holding unit 111 is equivalent to holding of an attribute by attribute-setting unit 112, and therefore, attribute-setting unit 112 is unnecessary. In such a case, an identifier is used in place of an attribute.

State determination unit 113 determines a state of the runtime environment executed in the foreground based on an identifier held by identifier-holding unit 111. In this embodiment, it is assumed that a state of a runtime environment is either "secure" or "non-secure." State determination unit 113 may determine a state of a runtime environment based on an identifier held by identifier-holding unit 111 and an attribute held by attribute-setting unit 112. In this case, state determination unit 113 may determine a type of the fee system or the operation means of the runtime environment executed in the foreground as a state of the runtime environment.

Also, in a case where a function that operates across a secure runtime environment and a non-secure runtime environment is executed in the foreground, state determination unit 113 makes a determination that a predetermined constant state should be notified during operation of the function, so that the state does not change in response to switching of the runtime environments. For example, state determination unit 113 asks an OS or middleware whether there is a function that is executed across runtime environments. Alternatively, state determination unit 113 receives a notification of a start or an end of a function that is executed across runtime environments from middleware or an application that implements the function.

Further, when the runtime environment executed in the foreground is switched from a non-secure runtime environment to a secure runtime environment, and the switching is carried out in response to an input made in the non-secure runtime environment, state determination unit 113 may determine that the state is non-secure irrespective of the runtime environment executed in the foreground. However, if a function executed in the secure runtime environment does not accept an input from the non-secure runtime environment, state determination unit 113 may determine that the state is secure. In this way, when a function implemented in the runtime environment executed in the foreground operates (or can operate) based on an input from a non-secure runtime environment, it is possible to avoid determining that the state is secure.

FIG. 4 is a table setting forth a correspondence between exemplary functions executed across multiple runtime environments and states determined for respective functions. In this table, a telephone function is a function for allowing a user to make a telephone call to another user by use of information-processing apparatus 10, in which a telephone number of the other user is selected from an address book and is dialed, and during the call, a variety of information is displayed on the display device. In this case, an operation until the dialing is completed is carried out in a non-secure runtime environment, while an operation after the dialing is completed is carried out in a secure runtime environment. Similarly, in an SMS (Short Message Service) function, an operation until text is input or a destination user is selected is carried out in a non-secure runtime environment, and a subsequent operation, such as transmission of data or display of information during the transmission, is carried out in a secure runtime environment. Further, in a GPS function, after a request for acquisition of position information is received from a user in a non-secure runtime environment, a request to positioning unit 500 and display of information during acquisition of position information are carried out in a secure runtime environment, and an operation after acquisition of position information is carried out in a non-secure runtime environment.

When these functions operate, state determination unit 113 determines that the state is constant from a start to an end of each function, irrespective of switching of runtime environments. For example, while the telephone function is being executed, state determination unit 113 determines a state such that notification that the state is invariably non-secure is performed, although an operation after the dialing is completed is carried out in a secure runtime environment. In this way, it is possible to prevent the notified state from changing frequently when a user performs an operation relating to a function that is implemented across secure and non-secure runtime environments, thereby to avoid causing confusion to the user.

State notification unit 114 causes hardware device(s) 300 to notify the state determined by state determination unit 113. Of hardware device(s) 300, state notification unit 114 causes a hardware device(s) that can be accessed from a secure runtime environment but cannot be accessed from a non-secure runtime environment to notify the state. A type of such a hardware device(s) can vary depending on a runtime environment executed by information-processing apparatus 10 or a concrete configuration of information-processing apparatus 10. State notification unit 114 transmits an inquiry to an OS or refers to data hard-coded in software to recognize presence of such a hardware device(s).

The timing at which state notification unit 114 causes notification to be performed is not limited to a time at which the foreground runtime environment is switched. State notification unit 114 may cause the state determined by state determination unit 113 to be notified at any of a variety of timings such as when a user performs an operation of requesting confirmation of the state, when information-processing apparatus 10 returns from a power-saving state (a sleep state, a hibernation state, or the like) to a normal state, when locking of an operation means is released, when information-processing apparatus 10 is started up, or at every predetermined period (e.g., every one hour). Further, state notification unit 114 may cause a predetermined image (a pictogram, an icon, or the like) to be always displayed on the display device, so that notification of the state can be performed by a change in the image.

It is to be noted that state notification unit 114 may use a combination of a plurality of hardware devices. For example, state notification unit 114 may use illumination device 320 and audio device 330 to notify the state of information-processing apparatus 10 with light and sound. Further, in a case where a hardware device to be used for notification is used for another function, state notification unit 114 may cause another substitute hardware device to perform notification. For example, in a case where the state of information-processing apparatus 10 is to be notified with light and sound, but a music player is implemented by a runtime environment and audio device 330 is thus in use, state notification unit 114 causes only illumination device 320 to perform notification of the state of information-processing apparatus 10. Also, in a case where notification should be performed by audio device 330 but audio device 330 is used by a music player, state notification unit 114 may cause illumination device 320, instead of audio device 330, to perform notification.

Further, in a case where a function that operates across a secure runtime environment and a non-secure runtime environment is executed, state notification unit 114 may cause notification to be performed in a manner different to that in which notification is performed in another case. For example, when, after a function is executed in a non-secure runtime environment, the runtime environment is temporarily switched to a secure runtime environment, and thereafter the runtime environment is again switched to a non-secure runtime environment, state notification unit 114 may cause notification to be performed, when the secure runtime environment is executed, so as to notify that the state of information-processing apparatus 10 is temporarily changed. A mode of notification of such a state may be any mode, so long as it differs from each of a mode of notification of a "secure" state and a mode of notification of a "non-secure" state. For example, in a "secure" state or a "non-secure" state, state notification unit 114 causes touch screen device 310 to display a predetermined image (without screen blinking), while in a case where a function that operates across a secure runtime environment and a non-secure runtime environment is executed, state notification unit 114 causes the displayed image to blink. Also, it is possible that state notification unit 114 causes different hardware devices respectively to be used for a case where a "secure" state or a "non-secure" state is notified and for another case.

Runtime environment-switching unit 115 functions in cooperation with an operation means for allowing a user to switch the foreground runtime environment. This operation means may be any device that has two or more states, such as a button, a lever, a sensor, or the like. Runtime environment-switching unit 115 detects an output from the operation means, and switches the foreground runtime environment based on a result of the detection. The operation means may be included in a hardware device having a function of notifying a state of information-processing apparatus 10. For example, switch device 350 serves as an operation means. Also, a predetermined area of touch screen device 310 may function as an operation means for switching the runtime environment.

Process-suspending unit 116 suspends a predetermined specific process when the specific process is executed by a runtime environment, and adds a notification process conducted by state notification unit 114. When process-suspending unit 116 functions, information-processing apparatus 10 notifies a user of a state of information-processing apparatus 10 prior to or during execution of the specific process. The "specific process" herein typically is a process relating to security, and may be, for example, a process for prompting input of important information (e.g., personal information such as a password, or the like), a process for displaying such information, a process for prompting a user to select or set some information, a process for starting data communication, and so on. In a case where the specific process is suspended and the notification is performed, state notification unit 114 may cause the notification to be performed in a manner different to that in which notification is performed in another case.

Pattern-setting unit 117 sets a notification pattern of a state of information-processing apparatus 10, and holds setting information. In a case where pattern-setting unit 117 has performed setting, state notification unit 114 refers to the setting information held by pattern-setting unit 117, and causes a state of information-processing apparatus 10 to be notified in the notification pattern that has been set. The setting may specify which of hardware device(s) 300 is to be used for notification, or may specify a mode of notification performed by each device (a light color, a light flickering pattern, an image to be displayed, a sound, a vibration pattern, and so on). The setting may be made by an input operation carried out by a user of information-processing apparatus 10. However, the setting also may be made by another user such as an administrator of information-processing apparatus 10, via communication unit 400.

The foregoing is a description of the configuration of information-processing apparatus 10. With such a configuration, information-processing apparatus 10 receives an operation performed by a user, and executes various processes while switching the runtime environment executed in the foreground, as necessary. Information-processing apparatus 10 notifies a user of its state in response to the switching of the runtime environment executed in the foreground.

FIG. 5 is a flowchart showing a notification process executed by control unit 100. This notification process is executed each time the runtime environment executed in the foreground is switched. In this notification process, control unit 100 switches the runtime environment executed in the foreground from a secure runtime environment to a non-secure runtime environment (or vice versa) (step S1). This switching is performed in response to a user operation or a system event. Upon switching of the runtime environments, control unit 100 acquires an identifier of the runtime environment after the switching, and holds the acquired identifier (step S2). Thereafter, control unit 100 determines a state of the apparatus based on the held identifier (step S3). At this time, control unit 100 may use the setting provided by attribute-setting unit 112 to determine the state.

After determining the state in step S3, control unit 100 determines whether a function that operates across a secure runtime environment and a non-secure runtime environment is being executed (step S4). If such a function is being executed, control unit 100 determines that the state of the apparatus is a state predetermined for the function, irrespective of the state determined in step S3 (step S5). Namely, in this case, the determination made in step S3 is made null. On the other hand, if the function being executed does not operate across a secure runtime environment and a non-secure runtime environment, control unit 100 skips the process of step S5. That is, in this case, the determination made in step S3 is valid.

After the state of the apparatus is determined as described in the foregoing, control unit 100 selects a notification pattern according to a direction of switching of the runtime environments (step S6). It is to be noted here that the "direction" of switching indicates that the switching has been made from a secure runtime environment to a non-secure runtime environment or that the switching has been made from a non-secure runtime environment to a secure runtime environment. Also, control unit 100 selects a notification pattern according to a cause of the switching of the runtime environments (step S7). Namely, control unit 100 determines whether the switching of the runtime environments was caused by a user operation or by a system event, and selects a notification pattern corresponding to each case. After selecting a notification pattern as described above, control unit 100 causes hardware device(s) 300 to notify the state of the apparatus in the selected notification pattern (step S8).

It is to be noted that control unit 100 may perform either the selection in step S6 or the selection in step S7, or may determine a notification pattern based on a combination of these selection results. Further, in a case where two of hardware devices 300 are used for notification, control unit 100 may determine a notification pattern of a first device based on the selection result in step S6, and determine a notification pattern of a second device based on the selection result in step S7.

When a notification process is performed at a timing other than when the runtime environment executed in the foreground is switched, the notification process is also performed according to some of the steps of the flowchart shown in FIG. 5. For example, when a user performs an operation of requesting confirmation of a state of the apparatus, control unit 100, which receives the operation, performs the process in step S3 and thereafter to notify the state of the apparatus.

Figure 6:
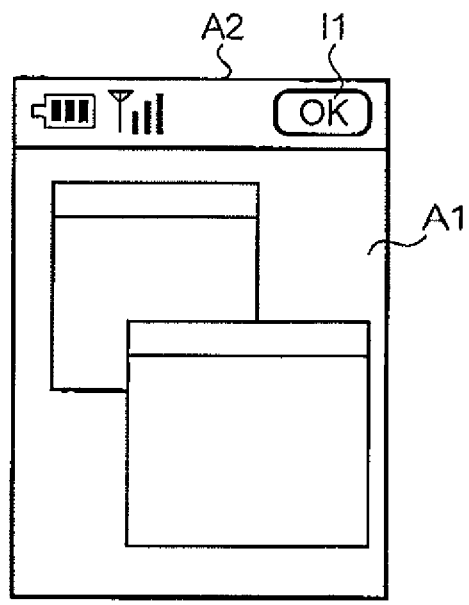
FIG. 6 is a diagram showing an exemplary mode of notification.

FIGS. 6-10 are diagrams showing exemplary modes of notification performed by information-processing apparatus 10. FIG. 6 shows an example in which touch screen device 310 is used for notification. In FIG. 6, a screen displayed by touch screen device 310 is divided into window area A1 and status bar area A2. Window area A1 is an area in which windows are displayed, and that can be accessed from each of a secure runtime environment and a non-secure runtime environment. On the other hand, status bar area A2 is an area in which various states relating to information-processing apparatus 10 (such as a remaining battery charge, an intensity of a received electromagnetic wave, and so on) are displayed, and that cannot be accessed from a non-secure runtime environment and can be accessed only from a secure runtime environment. Status bar area A2 corresponds to an example of a "specific area" of the present invention. It is to be noted here that icon I1 is an image representing a state relating to a security level. For example, when a secure runtime environment is executed in the foreground, the icon resembles "OK," and when a non-secure runtime environment is executed in the foreground, the icon resembles "!".

In this way, even though a part of touch screen device 310 can be accessed from a non-secure runtime environment, it is possible to prevent display of a state from being altered deceptively via a non-secure runtime environment.

In the example shown in FIG. 6, touch screen device 310 may be adapted to receive a user operation at a position where icon I1 is displayed, such that upon indication of the position by a user, the runtime environment executed in the foreground is switched.

Figure 7A:
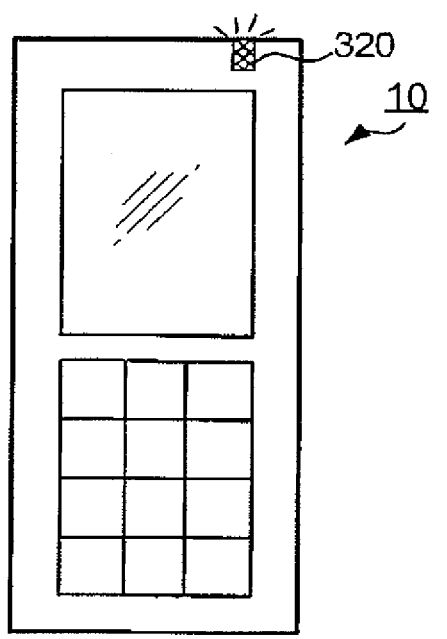
FIGS. 7A and 7B are diagrams showing an exemplary mode of notification.
Figure 7B:
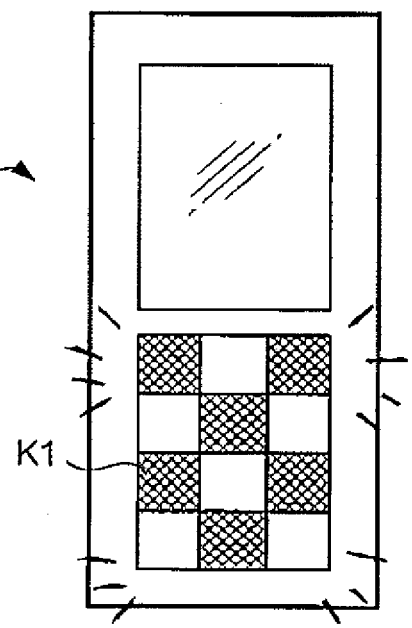

FIGS. 7A and 7B show an example in which illumination device 320 is used for notification. As shown in FIG. 7A, illumination device 320 is provided at a predetermined position on information-processing apparatus 10. Also, as shown in FIG. 7B, illumination device 320 may serve as a backlight for illuminating keypad K1. In this case, illumination device 320 may represent a state of information-processing apparatus 10 by changing a position where a key is illuminated.

Figure 8:
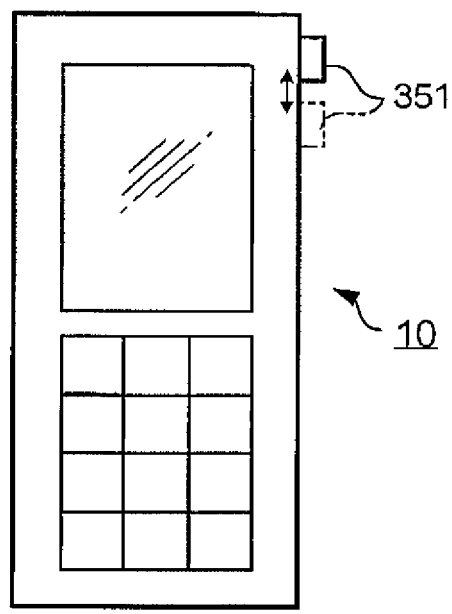
FIG. 8 is a diagram showing an exemplary mode of notification.

FIG. 8 shows an example in which switch device 350 is used for notification. Switch device 350 includes projecting switch part 351. Switch part 351 can be caused to move reciprocally between a position shown by a solid line and a position shown by a long- and double-short dashed line, and represents a state of information-processing apparatus 10 based on which of these positions switch part 351 is located in.

Figure 9A:
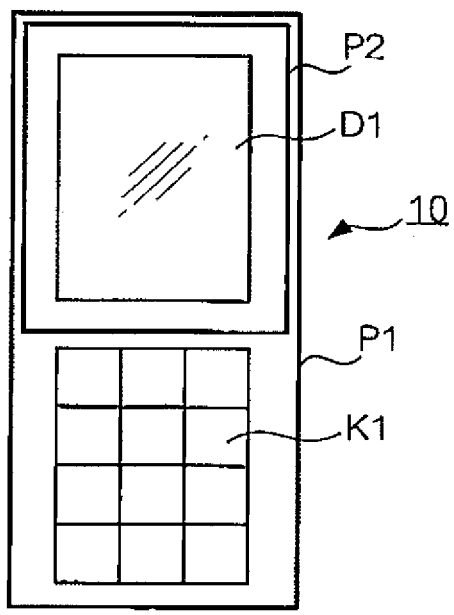
FIGS. 9A and 9B are diagrams showing an exemplary mode of notification.
Figure 9B:
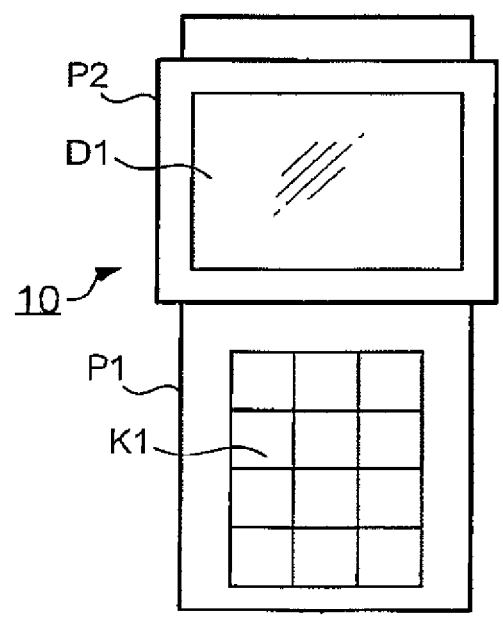

FIGS. 9A and 9B show an example in which information-processing apparatus 10 is caused to change its form to notify a state. In FIGS. 9A and 9B, information-processing apparatus 10 includes first part P1 having keypad K1 and second part P2 having display device D1, such that positions of these parts relative to each other can change. Second part P2 is rotatable relative to first part P1, so that second part P2 can be placed in a first position in which the longer side of display device D1 extends vertically (see FIG. 9A) and a second position in which the longer side of display device D1 extends horizontally (see FIG. 9B). In this case, one of the first position and the second position corresponds to a secure state, while the other corresponds to a non-secure state. It is to be noted that display device D1 may be adapted such that an up/down direction of the screen can change between the first position and the second position.

FIGS. 10A-10C show another example in which information-processing apparatus 10 is caused to change its form to notify a state. Information-processing apparatus 10 has a foldable structure, where in a folded state shown in FIG. 10A, display device D1 and keypad K1 face each other so as to be concealed. In this configuration, first part P1 and second part P2 can rotate relative to each other by means of a hinge or the like, whereby they can be brought into a first state shown in FIG. 10B and a second state shown in FIG. 10C. When information-processing apparatus 10 is caused to undergo transition from the first state to the second state, it is brought into a folded state temporarily during the transition.

It is to be noted that information-processing apparatus 10 may be adapted to change its form by sliding of a part thereof relative to another part, instead of rotation by means of a hinge or the like.

As is described in the foregoing, information-processing apparatus 10 can notify a user of its state in an appropriate manner that can be readily understood by the user, thereby to attract a user's attention in a readily understandable manner. Also, since information-processing apparatus 10 performs notification of its state by use of hardware device 300 that cannot be accessed from a non-secure runtime environment, it is possible to prevent a notification from being deceptively altered by malicious software. Further, information-processing apparatus 10 suspends execution of a specific process and notifies a state of the apparatus, whereby a user can confirm the state easily when a process for which security is required is executed.

The foregoing exemplary embodiment is merely one example of the present invention, and may be modified as will be described below. The following modifications may be used in any combination, as necessary.

In the present invention, a configuration for implementing runtime environments is not limited to that shown in FIG. 2. For example, it is possible that a host OS implements a secure runtime environment, and a guest OS relating to the host OS implements a non-secure runtime environment.

Also, in the present invention, a number of runtime environments that can be executed interchangeably is not limited to two, and may be three or more. In such a case, it is sufficient that each of a number of secure runtime environments and a number of non-secure runtime environments is equal to or greater than one.

The states to be notified in the present invention may be represented in three levels or more, instead of being represented in two levels of "secure" and "non-secure." For example, in addition to a state of "high" security level and a state of "low" security level, an intermediate state may be included in the states to be notified in the present invention.

Also, a state to be notified in the present invention may be a fee system or a system of operation, instead of a security level, or may be any combination of states.

As is described in the foregoing, a hardware device of the present invention may also function as an operation means. In such a case, an operation that is input via the operation means may be for controlling a runtime environment that can be executed in the foreground. For example, in the example shown in FIGS. 9A and 9B, when a user performs an operation of rotating second part P2, if second part P2 is placed in the first position, only a secure runtime environment is allowed to be executed in the foreground, and if second part P2 is placed in the second position, only a non-secure runtime environment (or both a secure runtime environment and a non-secure runtime environment) is allowed to be executed in the foreground.

The present invention may be embodied as a program for causing a computer (a CPU or the like) of an information-processing apparatus to implement the present invention or as a storage medium, such as an optical disk, on which the program is stored. A program according to the present invention may be downloaded to a computer via a network such as the Internet, and installed in the computer for use.

What is claimed is:

1. A state notification apparatus comprising:
    a hardware processor configured to:
        hold an identifier of a runtime environment being executed in a foreground when one or more secure runtime environments and one or more non-secure runtime environments are selectively executed in the foreground;
        determine a state of the runtime environment executed in the foreground based on the held identifier;
        determine a constant state of the runtime environment when a function that operates across the secure runtime environment and the non-secure runtime environment is executed; and
        cause a hardware device that cannot be accessed from the one or more non-secure runtime environments to notify the determined state.

2. The state notification apparatus according to claim 1, wherein the processor is further configured to set an attribute of each of the runtime environments,
    wherein the determined state is based on the held identifier and the set attributes.

3. The state notification apparatus according to claim 2, wherein the set attributes represent security levels of the respective runtime environments.

4. The state notification apparatus according to claim 1, wherein, in a first case where a function that operates across the secure runtime environment and the non-secure runtime environment is executed, the notification of the state is performed in a manner different to that in which the notification is performed in a second case.

5. The state notification apparatus according to claim 1, wherein the processor is further configured to switch the runtime environment executed in the foreground according to an output from an operation device, and
    the hardware device includes a hardware device that also functions as the operation device.

6. The state notification apparatus according to claim 5, wherein the operation device includes a first part and a second part that can be viewed by a user, positions of the first part and the second part relative to each other being changeable by folding, sliding, or rotating action, to achieve switching of the runtime environment or notification of the state.

7. The state notification apparatus according to claim 5, wherein the hardware device includes a touch screen device having a first area that cannot be accessed from the non-secure runtime environment and a second area that can be accessed from the non-secure runtime environment, the first area realizing the operation-device.

8. The state notification apparatus according to claim 5, wherein the processor is further configured to notify the state in a manner according to a direction of switching of the runtime environment.

9. The state notification apparatus according to claim 5, wherein the processor is further configured to cause a mode of notification to change depending on whether the switching of the runtime environment executed in the foreground is caused by a user operation or a system event.

10. The state notification apparatus according to claim 1, wherein the hardware device includes a display device, an illumination device, an audio device, a vibrator device, or a switch device.

11. The state notification apparatus according to claim 1, wherein the processor is further configured to acquire the held identifier of the runtime environment executed in the foreground, the held identifier being managed by a display function that switches display of a screen corresponding to the runtime environment executed in the foreground, and switching the held identifier in response to switching of the screen.

12. The state notification apparatus according to claim 1, wherein the processor is further configured to notify the state in response to a user operation.

13. The state notification apparatus according to claim 1, wherein the processor is further configured to notify the state at least one of when the apparatus returns from a power-saving state to a normal state, when locking of operation is released, when the apparatus is started up, and at every predetermined period.

14. The state notification apparatus according to claim 1, wherein the processor is further configured to suspend a first specific process when a runtime environment executes a second specific process, and
    wherein when the first specific process is suspended, the hardware device notifies a state corresponding to the first specific process.

15. The state notification apparatus according to claim 1, wherein the processor is further configured to cause a plurality of other hardware devices to notify the state, and when there is a hardware device of said plurality of other hardware devices used by any of the runtime environments for a function other than the notification, uses a second hardware device of said plurality of other hardware devices to notify the state.

16. The state notification apparatus according to claim 1, wherein the processor is further configured to set a pattern of notification of the state by the notification unit.

17. The state notification apparatus according to claim 1, wherein the processor is further configured to notify the state of a runtime environment corresponding to a displayed window in a single window system, or notifies the state of a runtime environment corresponding to a window that is displayed forefront in a multi-window system.

18. A state notification method executed by a state notification apparatus, comprising:
    when one or more secure runtime environments and one or more non-secure runtime environments are selectively executed in a foreground, holding an identifier of a runtime environment that is being executed in the foreground;
    determining a state of the runtime environment executed in the foreground based on the held identifier;

determining a constant state of the runtime environment when a function that operates across the secure runtime environment and the non-secure runtime environment is executed; and causing a hardware device that cannot be accessed from the one or more non-secure runtime environments to notify the determined state.

19. A non-transitory computer-readable storage medium storing a program for causing a computer to execute the steps of:

when one or more secure runtime environments and one or more non-secure runtime environments are selectively executed in a foreground, holding an identifier of a runtime environment that is being executed in the foreground;

determining a state of the runtime environment executed in the foreground based on the held identifier;

determining a constant state of the runtime environment when a function that operates across the secure runtime environment and the non-secure runtime environment is executed; and causing a hardware device that cannot be accessed from the one or more non-secure runtime environments to notify the determined state.

* * * * *